FIG. 1.

Aug. 17, 1937.  R. H. LAWSON ET AL  2,090,597
SELECTIVE CONTROLLING MEANS FOR KNITTING MACHINES
Filed July 18, 1932   9 Sheets-Sheet 5

INVENTORS:
ROBERT H. LAWSON
AUGUSTIN GAGNE,
By Roy F. Lovell
ATT'Y.

Patented Aug. 17, 1937

2,090,597

UNITED STATES PATENT OFFICE 2,090,597

SELECTIVE CONTROLLING MEANS FOR KNITTING MACHINES

Robert H. Lawson, Pawtucket, and Augustin Gagné, Central Falls, R. I., assignors to Hemphill Company, Central Falls, R. I., a corporation of Massachusetts Application July 18, 1932, Serial No. 623,140

23 Claims. (Cl. 66—36)

This invention relates to a new and improved mechanism for variably controlling needles of a knitting machine, being shown by way of example as applied to a knitting machine of the type disclosed in the patent to Hemphill 933,443, Sept. 7, 1909.

The knitting machine which is indicated generally by the numeral 1 is provided with a needle cylinder 2 and a sinker head 3 as well as a stationary circular cam plate 4 which carries the cam ring 5 for controlling the movements of the needles 6 in a manner hereinafter to be more fully described. Below the plate 4 is mounted a circular base 7 upon the upper surface of which are rigidly mounted cams 8 and 8' for controlling the jacks 9 in a manner hereinafter to be more fully described.

For the purpose of selectively controlling the jacks 9 means are provided including a drum 10 consisting of a plurality of discs 11 mounted upon a stud or spindle 12, a top plate 13 being also mounted upon the stud 12. The discs 11 and plate 13 are maintained in position on the stud 12 as by means of a nut 14. The individual discs 11 are each provided with a series of frangible butts some of which are broken off, the disposition of the butts left on the discs depending upon the design to be knitted. Cooperating with the butts on the discs 11 are a series of plungers 15 which correspond in number to the number of discs 11, one such plunger 15 being located at the elevation of a companion disc 11. The plungers 15 are mounted to slide more or less radially of the needle cylinder 2 and in a recess or slot provided by a bracket 16 which is rigidly mounted upon the upper surface of the circular base 7.

The drum 10, including the discs 11, top plate 13, etc., is mounted to turn upon the stud 12 which is fixed to a plate 17 which in turn is pivotally connected to a bracket plate 18 which latter is fastened to the underside of circular base 7 by means of screws 19. Rigidly connected to the drum 10, which includes the discs 11, is a ratchet 20 and loosely mounted upon a hub of the said ratchet 20 is a pawl mechanism 21. Thus the rigidly mounted stud 12 serves as a bearing for the drum 10 and ratchet 20.

The pawling mechanism 21 (Fig. 3) consists of a plate 22 upon which are pivotally mounted, on a stud 23, pawls 24, 24' such pawls being retained in position adjacent to the ratchet teeth by means of springs 25 which are fastened at one end to the pawls 24, 24' and at the other end to a pin or screw 26 upstanding from the plate 22. Mounted upon bracket plate 19 is a cam 27 which serves, when the drum 10 is in the inoperative position shown in Fig. 3, to engage a pin 28 depending from the lowermost pawl 24' so that the said pawl will not advance the drum 10 when the said drum is not in position adjacent to the needle cylinder. When the drum 10 is in operative position adjacent to the needle cylinder, both pawls 24 and 24' are constantly being actuated in a manner hereinafter to be described, the upper pawl 24 normally advancing the drum step by step during the knitting of a plurality of courses of special stitch fabric and acting to re-time the drum during the knitting of other courses, finally coming to rest when a portion of the ratchet from which a tooth is missing comes opposite the said pawl, such pawl thereafter idly reciprocating along such toothless portion until the lowermost and starting pawl 24' again engages the ratchet teeth which is when the drums 10 are moved adjacent to the needle cylinder. As hereinbefore stated the pawl carrying plate 22 is mounted loosely upon a hub of the ratchet 20. Rocking movements are imparted to the pawl carrying plate 22 by means of connections including a link 29 which is pivotally connected at 30 to the plate 22 and at its other end is pivotally connected at 31 to a bell crank lever 32 which in turn is mounted upon a stud 33 upstanding from plate 34 which constitutes an extension of the circular base 7, the other arm of the bell crank lever 32 being pivotally connected by means of a pin or screw 35 to a link 36 the other end of which (Figs. 2 and 3a) is pivotally connected by means of a pin 37 or screw to a depending link or lever 38 which passes through and is laterally supported by a bar or plate 38' which is fastened to an extension of the circular base, at its other end is pivoted upon a pin or screw 39 carried upon the machine frame. Intermediate the ends of the arm or link 38 there is fastened a cam 40 which is periodically engaged by one or more pins 41 carried by and movable with the "104" gear 42, the pin or pins 41 being provided to rock the lever 38. Obviously if one pin 41 only were used the cam 40 would be actuated once every four courses, if two oppositely disposed pins 41 were used the cam 40 would be actuated every other course, and if four equally spaced pins 41 were used, the cam 40 would be actuated each course. The links 29 and 36 are so constructed as to be adjustable in length.

Figure 2:
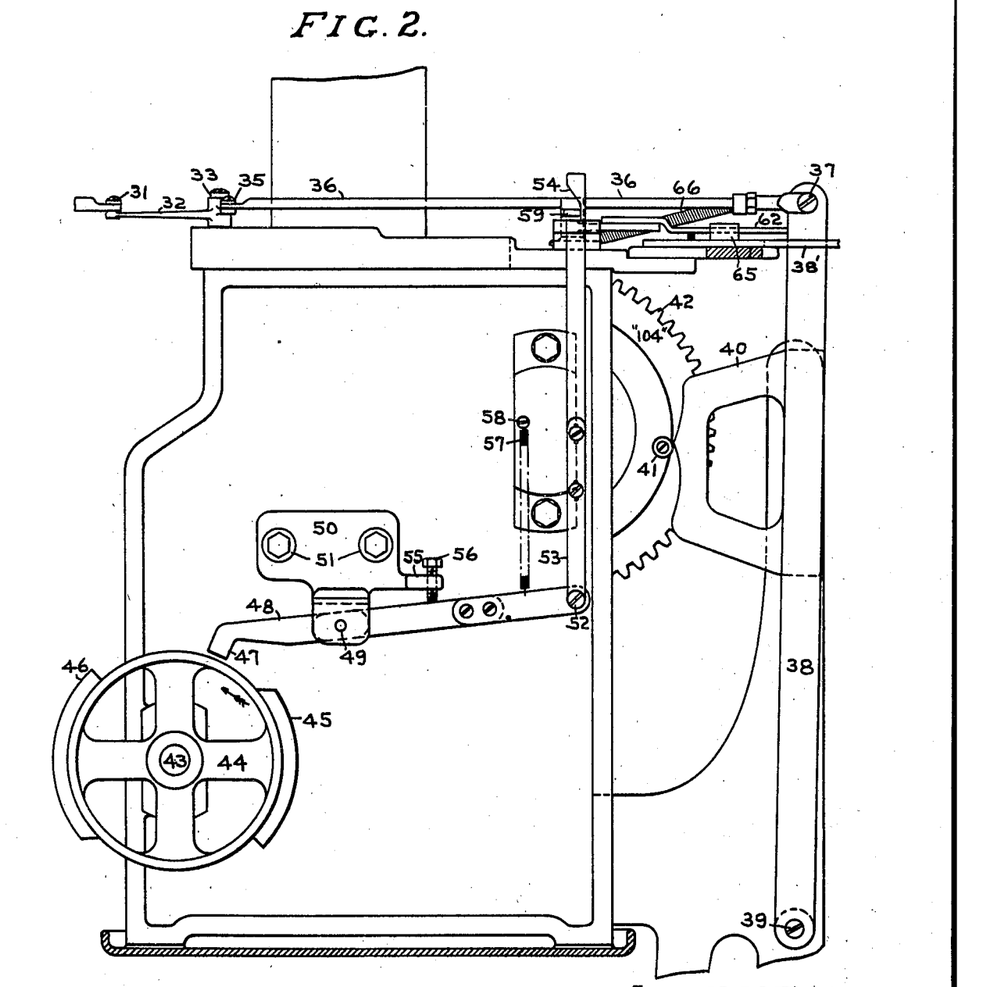
Fig. 2 is a similar view showing the other side of the machine and other connections for effecting the automatic operation thereof.

Upon the main cam shaft 43 of the machine (Fig. 2) there is fixedly mounted a cam drum 44 upon the periphery of which are mounted two cams 45 and 46 each of which is adapted, when the drum rotates in the direction of the arrow, Fig. 2, to engage the toe 47 of a lever 48 which is pivoted intermediate its ends upon a pin 49 carried by a bracket 50 which is fastened to the machine frame as by means of screws 51. The other arm of the lever 48 is adjustable in length and to the free end thereof is pivotally connected by means of a pin or screw 52 a specially constructed rod or link 53 which is adjustable in length and is provided at its upper end with a cut-out portion or cam 54 for a purpose presently to be described. The bracket 50 is provided with a laterally extending portion 55 through which adjustably passes a stop screw 56 which is adapted to engage the lever 48 and limit the movement of one arm thereof, and consequently the link 53, in an upward direction under the influence of a coil spring 57 which latter is fastened at one end to one arm of the lever 48 and at its other end to a pin or screw 58 projecting laterally from the machine frame. When the heel portions and preferably but not necessarily when some of the toe portions of stockings are being knitted the toe 47 is in engagement with the drum surfaces between cams 45 and 46, the parts consequently being in the position shown in Figs. 2 and 3a where a bell crank lever 59 (Fig. 3a) is shown as having one arm thereof seated within the recessed edge or cam 54 provided in the upper portion of the link 53. The bell crank lever 59 is pivoted upon a pin or stud 60 which is fastened to a plate or bracket 61 which in turn is fastened to the circular base or rather to an extension thereof. The plate or bracket 61 is provided with a recess or hole through which the link 53 passes. The other arm 62 of the bell crank lever is adjustable in length and is—when in the full-line position shown in Fig. 3a—in engagement with the lever 38 as also shown in Fig. 2. The coil spring 63 is fastened intermediate the end of the arm 62 and at its other end is fastened to a pin or screw 64 which in turn is fastened to and upstands from the extension of the circular base. A plate 65 is fastened to the plate or bar 38' and is provided with a portion spaced from the said extension thereby to permit the arm 62 to be received between the said plate 65 and the extension of the circular base, the said plate acting as a stop to limit the movement of the arm 62 (see dotted line position) when the bell crank lever is actuated by movement of the cam 54 in a manner hereinafter to be described. As will be evident from inspection of the drawings, when the parts are in the position shown in Fig. 2, engagement of a pin 41 with the cam 40 will not actuate the pawling mechanism 21 but will merely serve to rock the lever 38 slightly against the retractile force of a coil spring 66 which is attached to a pin or screw 67 carried by collar 68 which is fastened by the said screw 67 to the link 36. The other end of the spring 66 is fastened to a pin or screw 69 upstanding from the extension of the circular base. With the parts in the position shown in Fig. 2, the arm 62 of the bell crank lever limits the movement of the lever 38 under the influence of the spring 66, the limiting of the movement preventing the actuation of the pawling mechanism.

Figure 3:
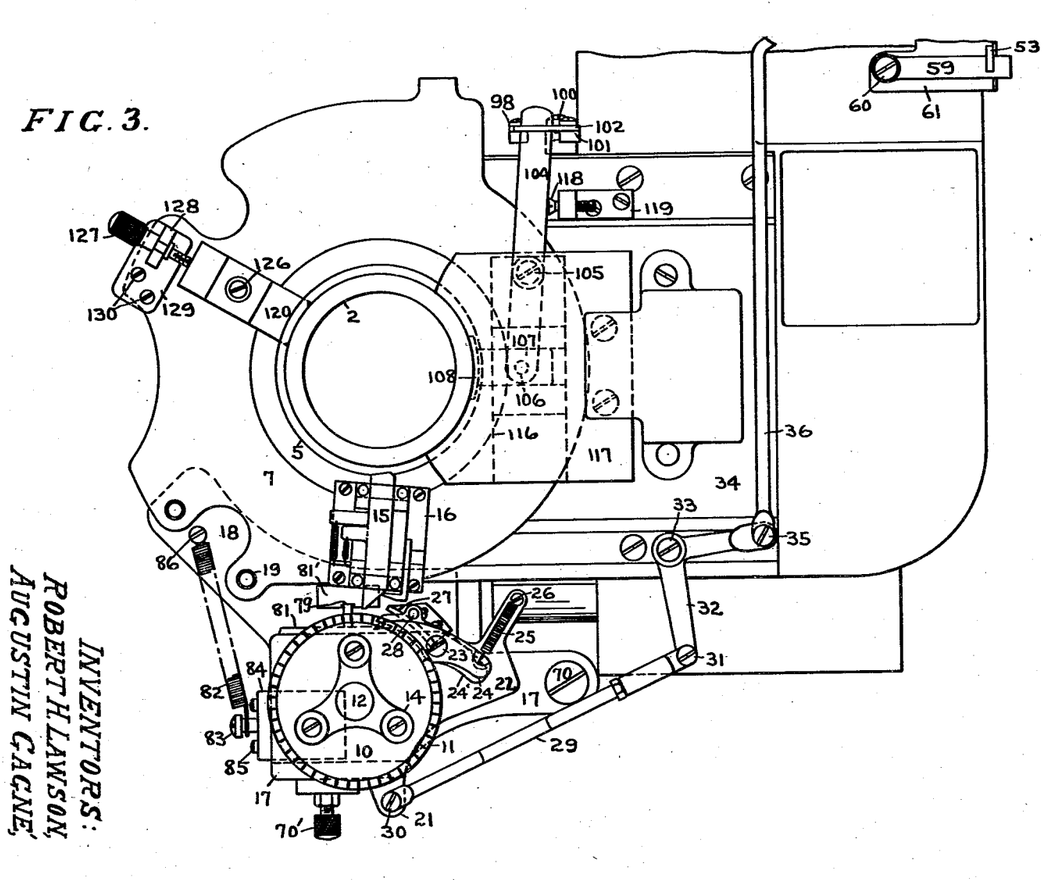
Fig. 3 is a view in plan, parts being broken away.
Figure 3A:
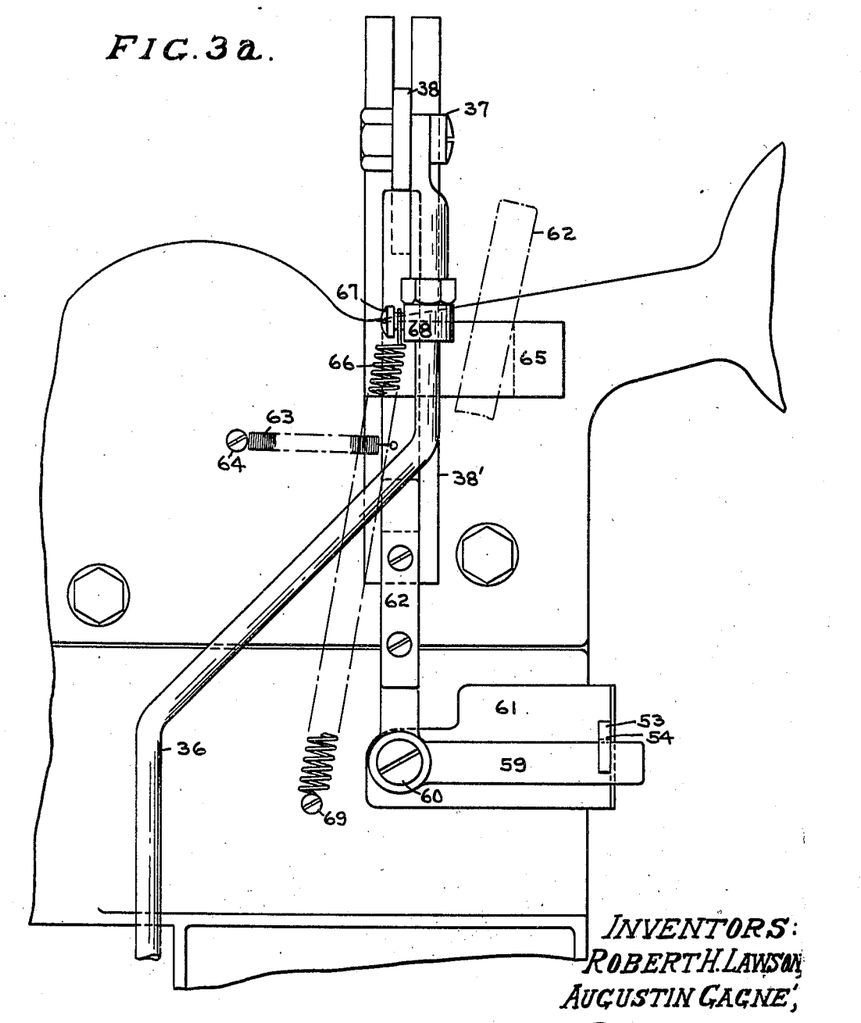
Fig. 3a is a fragmentary plan view on an enlarged scale supplementing the view shown in Fig. 3.
Figure 4:
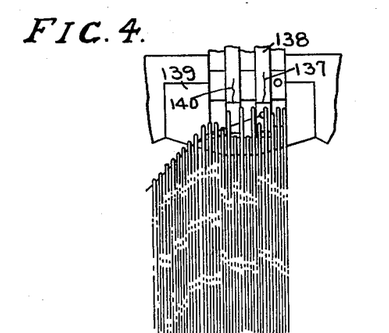
Fig. 4 is a fragmentary view showing how the needles, when selected, may engage and knit an additional thread while others not so selected do not knit the said thread.

When, due to continued rotation of the drum 44 in the direction of the arrow, Fig. 2, a cam such as the cam 45 engages toe 47 rocking the lever 48 upon its pivot 49 thereby lowering the link 53 and consequently the cam 54 which thereupon by engaging the arm 59 of the bell crank lever, rocks the arm 62 of the bell crank lever to the dotted line position shown in Fig. 3a, the result being that thereafter when a pin 41 engages the cam 40 and rocks the lever 38 the spring 66 imparts a full throw to the lever 38 and parts connected thereto whereupon the pawl carrying plate 22 is rocked and a pawl is permitted to engage the ratchet 20 and advance the said ratchet and consequently the drum 10 carried thereby. Advance of the drum 10 in the manner just described, causes a new vertical arrangement of butts on the periphery of the discs 11 to be positioned opposite their companion plungers 15 and causes the said butts on the discs 11 to engage their companion plungers 15 and advance them to a position adjacent to the needle cylinder such as that shown by the upper plunger 15 in Fig. 9.

Figure 1:
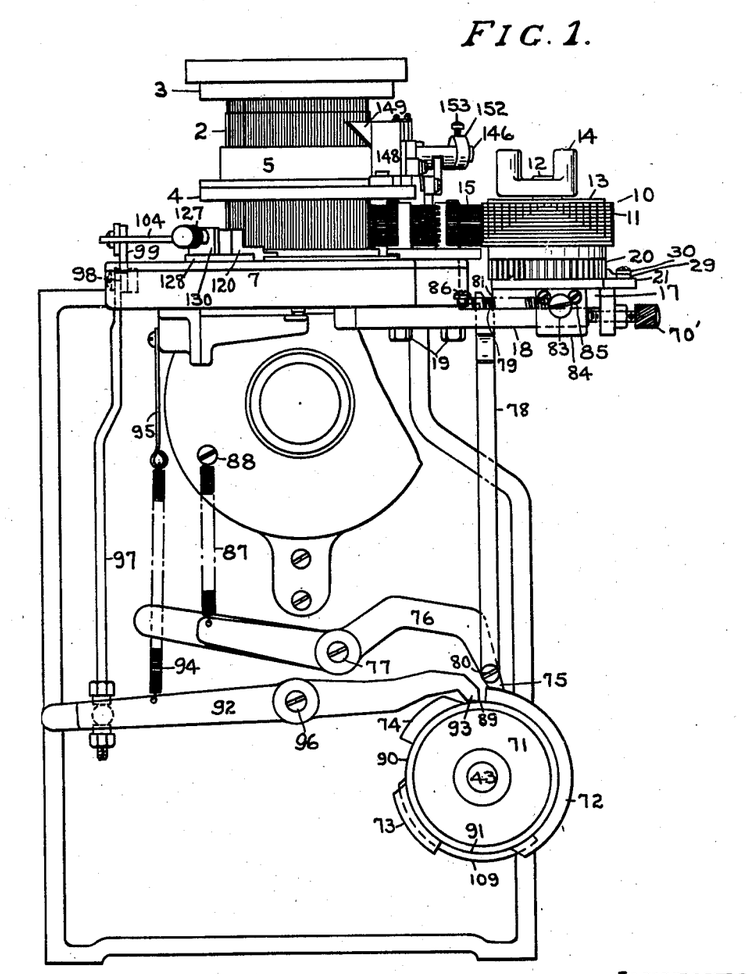
Fig. 1 is a view in side elevation showing some of the operating connections for automatically controlling some of the operations of a knitting machine.

In Figs. 1 and 3 the drum 10 is shown in a position spaced somewhat from the plungers 15 and consequently when in such position is inactive. The plate 17 upon which the drum 10 is mounted is pivotally mounted upon a stud 70 fixed to the machine frame through the bracket plate 18 and so that the drum 10 may move towards or away from the plungers 15, the movement of the drum 10 toward or in the direction of the needle cylinder being limited by a stop screw 70' which adjustably passes through a depending portion of the plate 17. It is desirable during the knitting of the portions of the stocking when the jack controlling mechanism is not controlling the operations of the jacks in a manner hereinafter to be described, that the drum 10 be moved to an inactive position where it cannot control the movements of the plungers 15 and for that purpose the mechanism shown in Figs. 1 and 3 is provided. The said mechanism includes a cam drum 71 mounted upon the main cam shaft 43, which drum 71 is provided with a plurality of cams 72, 73 and 74. As shown in Fig. 1, the toe 75 of a lever 76, which lever is pivoted at 77 to the machine frame, is in engagement with the cam 72. When the toe 75 of the lever 76 is in engagement with a cam such as the cam 72, a bar or rod 78, the upper surface of which is cam shaped as at 79, and which bar or rod 78 is pivotally connected at 80 to the lever 76, is maintained in a relatively raised position, in which position the cam 79 is in engagement with a hardened steel plate 81 fastened to and forming part of plate 17, the opposite or rear edge of the bar 78 engaging in a recess in another hardened steel plate 81' which is carried by the circular base 7, the engagement of a plate 81 by the cam 79 causing the plate 17 to be swung to the right upon its pivot 70, Fig. 3, and against the tension of a coil spring 82 one end of which is fastened to a pin or screw 83 fastened to and projecting laterally from a plate 84 which plate is angle-shaped and is connected to the plate 17 as by screws 85. The other end of spring 82 is fastened to a pin or screw 86 extending upwardly from and fastened to bracket plate 18. To the other arm of the lever 76 is attached a coil spring 87 the other end of the coil spring being fastened to a pin or screw 88 projecting laterally from the machine frame, the coil spring 87 acting to maintain the toe 75 of lever 76 in engagement with the surface of the drum 71 or upon the surface of one of the cams 72, 73 and 74 mounted thereon. Plate 84 is provided with a horizontally extending portion which underlies the bracket plate 18, such plate 84 serving to guide and steady the drum 10 and parts movable therewith when they are moved outwardly with respect to the plungers 15 by means of the cam 79. While the toe 75 is in engagement with the upper surface of the cam 72 the toe, ring toe and welt portions of the stocking are being knitted and when, due to continued rotation of the drum 71, the toe 75 of the lever 76 drops off cam 72, the spring 87 causes the toe 75 of the lever 76 to drop onto the surface of the drum at 89 where it remains during the knitting of portions of the stocking where the jacks are operative for controlling the movements of their needles and during this time, the cam 79 being retracted from the position shown in Fig. 1, the spring 82 maintains the drum 10 in operative position with respect to the plungers 15 and consequently periodic advancing movements imparted to the drum 10 by means of the pawl mechanism 21 hereinbefore described, causes plungers to be selectively advanced and consequently causes their companion jacks to be selectively controlled, all in a manner to be more fully described hereinafter. Continued rotation of the drum 71 from the position last described causes the cam 74 to engage toe 75 of lever 76 and again raise the cam 79 to the position shown in Fig. 1 where it remains during the knitting of plain (non-ornamented) portions of the top of the stocking. Further rotation of the drum 71 causes the toe 75 of the lever to drop onto the surface of the drum at 90 where it remains during the knitting of ornamented portions of the leg and/or instep of the stocking. Thereafter, as the drum 71 rotates, the cam 73 engages the toe 75 of the lever 76 and again causes the drum 10 to be retracted to the position shown in Figs. 1 and 3 where it remains throughout the knitting of the heel of the stocking. The cycle of operations is completed when the drum 71 further advances and permits the toe 75 to drop onto the surface of the drum at 91 where it remains throughout the knitting of the plain sole and ornamented instep of the stocking.

Figure 6:
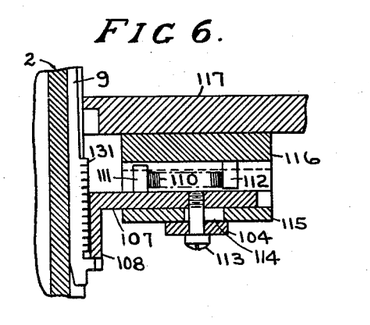
Fig. 6 is a fragmentary view in section taken along the line 6—6, Fig. 5.
Figures 17, 20:
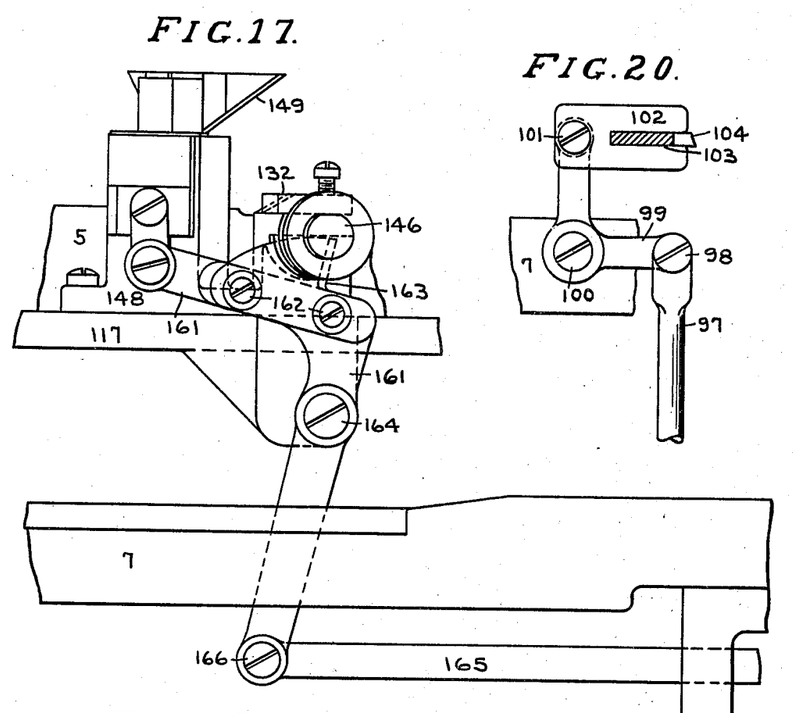
Fig. 17 is a view corresponding to Fig. 16 but showing the parts in another relative position.
Fig. 20 is a detail view.

While the cams 72, 73, 74 and drum portions 89, 90, 91 are controlling the movements of the lever 71 and connected parts, other cams mounted upon the drum 71 are controlling the movements of a lever 92 by engaging and raising the toe 93 thereof against the tension of a spring 94 connected at one end to lever 93 and at its other end to a wire 95 depending from and connected to the machine frame. The lever 92 is pivoted intermediate its ends upon a pin or screw 96 fastened to and projecting laterally from the machine frame. The other arm of the lever 93 has adjustably passing therethrough a link 97 which projects upwardly and at its upper end is pivotally connected at 98 to a bell crank lever 99 which in turn is connected at 100 (Fig. 20) to the circular base 7. The other arm of the bell crank lever is pivotally connected at 101 to an arm 102 which is bifurcated at its end as at 103, the bifurcated arms straddling the free end of a lever 104 (Fig. 3) which latter is pivoted intermediate its ends at 105 to the circular base 7 or to a cam ring later to be described. The other end of the lever 104 is pivotally connected at 106 to cam plate 107 which carries a cam 108 (Fig. 6) at its inner end, i. e., adjacent to the needle cylinder. Thus it will be understood that when a cam such as the cam 109 (Fig. 1) engages the toe 93 of the lever 92 and rocks the same and likewise the bell crank lever 99, the said lever 99 is caused to be rocked upon its pivot 100 thereby causing the cam 108 to withdraw from engagement with the short lower butts of the jacks for a purpose hereinafter to be described. The cam 109 maintains the toe 93 of the lever 92 elevated during the knitting of the plain sole portions of the stocking. At other times, namely, when the toe 93 of the lever 92 is in engagement with the surface of the drum as shown in Fig. 1 the bifurcated arm 102 is withdrawn from its forward position and consequently the cam 108 is urged to a position adjacent to the needle cylinder, in which position it engages all the lower butts of the jacks. A spring 110 which is compressed between the studs or plates 111 and 112 when the cam 109 is in engagement with the lever 92, exerts the pressure to force the cam 108 (Fig. 6) to such position closely adjacent to the needle cylinder. The sliding movements of a cam plate 107 are controlled and limited by means of a pin or screw 113 which passes through a slot 114 in a lower plate 115 of bracket 116 which is fastened to and depends from the underside of the cam ring or plate 117 which is provided with a recess 117' for the ready removal of needles and/or jacks. The movement of the cam 108 to a position adjacent to the needle cylinder is limited by means of a stop screw 118 (Fig. 3) which is adjustably mounted in a bracket 119 which is fastened to and depends from the extension of the circular base. The studs 111, 112 are connected to cam plate 107 and bracket 116 respectively.

Figure 8:
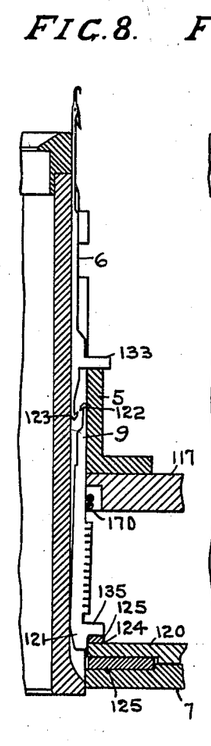
Fig. 8 is a sectional view showing how a non-selected jack and its companion needle operate.

After the jacks have been selected in a manner hereinafter to be more fully described, a cam plate 120 (Figs. 3 and 8) which cam plate 120 is more or less rounded on its inner edge or portion, engages the tails 121 of the jacks 9 to cause the jacks 9 to be rocked on a fulcrum adjacent to the lower portions thereof and in such a manner that the upper and hook shaped ends 122 of the jacks are moved to a position away from the hooked ends 123 of their companion needles 6, all as shown in Fig. 8. The cam plate 120 is fixed being held in an adjusted fixed position adjacent to the needle cylinder and passing through a slot 124 provided in the lower or jack cam ring 125 which includes cams 8, 8'. The cam plate 120 is adjustably retained in position adjacent to the needle cylinder by means of a screw 126 passing through a slot provided in the said cam plate 120, said screw 126 passing through a threaded hole in the circular base 7. A set screw 127 passes through an upright 128 connected to a plate 129 which is fastened to the circular base as by means of screws 130. The said screw 127 acts adjustably to position the cam plate 120 in a desired position adjacent to the needle cylinder after which adjustment the screw 126 is turned to clamp the cam plate 120 in position with respect to the circular base 7.

Figure 9:
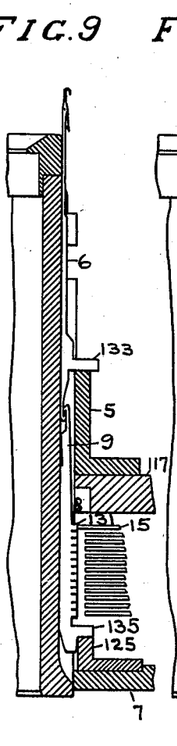
Figs. 9-12 inclusive are views showing the successive operative positions of a selected jack and its companion needle.
Figure 10:
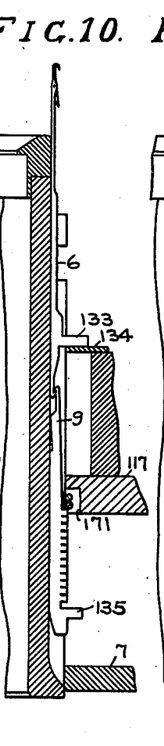
Figure 11:
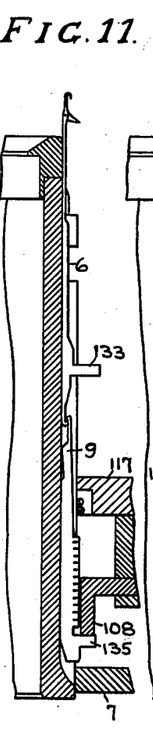
Figure 12:
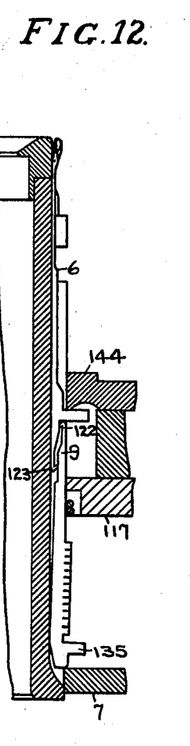
Figures 13, 14, 15, 16:
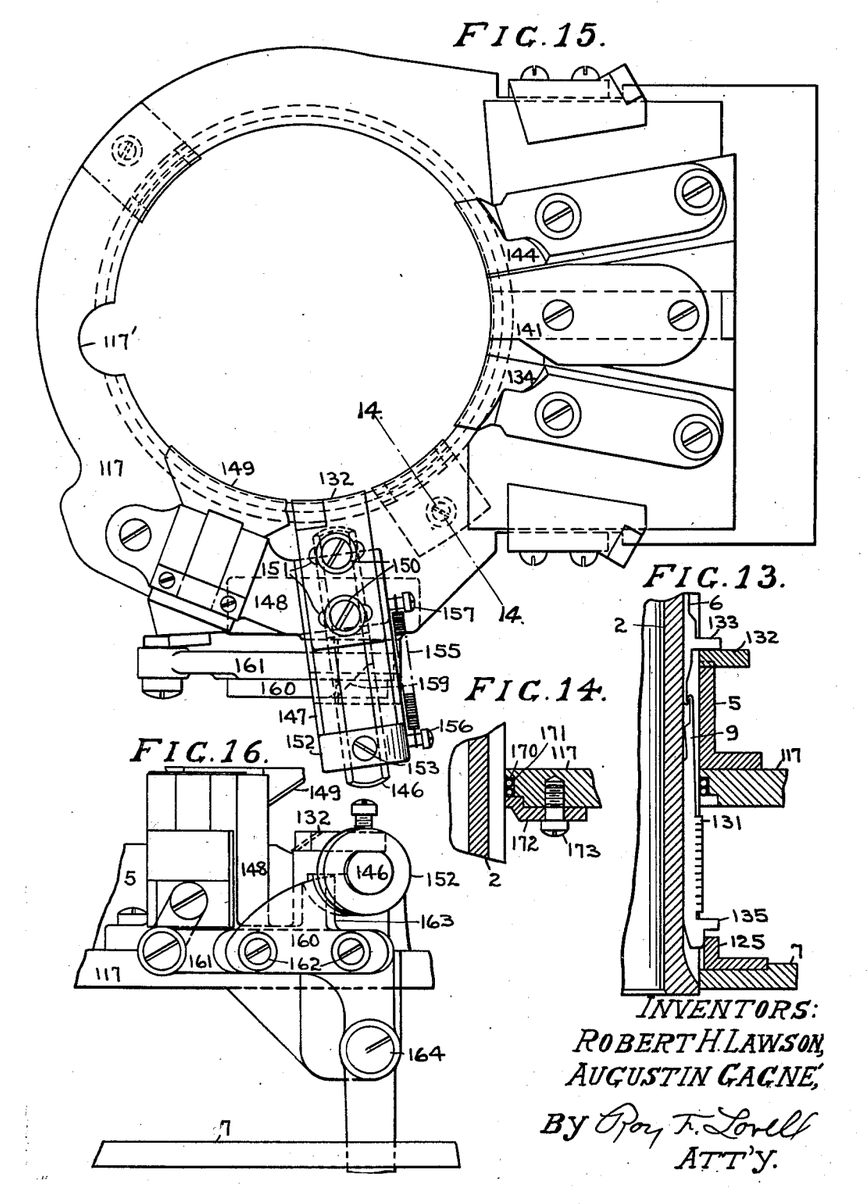
Fig. 13 is a fragmentary sectional view showing a jack and companion needle, the needle butt being shown as being engaged by a cam for the purpose of effecting operative engagement between interengaging formations on adjacent ends of the said jack and needle, the engagement being effected between the positions indicated in Figs. 9 and 10.
Fig. 14 is a fragmentary sectional view of a detail taken along the line 14—14, Fig. 15.
Fig. 15 is a plan view showing the cams for acting upon the needle butts.
Fig. 16 is a fragmentary view in elevation showing two of the cams disclosed in plan in Fig. 15.

In Figs. 8-12 inclusive and 13, successive positions of a needle and companion jack are shown. In Fig. 8, the jack 9 is shown as having been withdrawn to a non-needle engaging position. In Fig. 9, a plunger 15 is shown as being in engagement with one of the frangible butts 131 of a jack 9, such engagement causing the upper portion of the jack 9 to be deflected to such a lateral position that subsequent movements imparted to the needle and/or jack shall cause the hook-like formations 122 and 123 to interengage. Fig. 13 shows a cam 132 as having engaged the butt 133 of the needle and having consequently raised such needle to such a relative position with respect to its companion jack 9 as to cause the interengaging formations 122, 123 to interlock thereby preventing outward movement of the upper portion of the jack. Fig. 10 shows a later position in the knitting cycle and wherein a cam 134 is shown as having elevated needle 6 as well as its interengaged jack 9 to the uppermost or most advanced position. Fig. 11 is a view showing the relative positions of the needles and jack in a still later phase of the knitting cycle at which time the cam 108 is shown as having engaged the lower butt 135 of the jack and consequently lowered the same as well as its companion needle to the position shown. Whereas the needle 6 and companion jack 9 shown in Figs. 9-12 inclusive are shown as having been selected by means including a plunger 15 and a cam 108, it will be understood that others of the needles and jacks are not so selected, the needle butts travelling along a relatively elevated path such as that indicated by numeral 136 (Fig. 5) along which path they move and their needles engage a thread 137 which is fed to the needles through the medium of a thread or yarn lever 138 which is mounted in the mouthpiece 139 of a knitting machine in a well-known manner. The jacks and needles which were lowered by the cam 108 do not knit the thread 137, but all the needles, as they continue to rotate in the needle cylinder, thereafter engage a second thread 140 in their hooks, the needle butts 133 travelling along the upper path 136 being engaged and retracted by means of a cam 141 while the butts of the lowered needles are raised slightly by a cam surface 142 forming part of the center cam 143, all of the butts thereafter being engaged and caused to knit by the cam 144. Thereafter the butts of all the needles ride up a cam surface provided by cam ring 5 then traveling along the top of the cam ring until some of them are selected in a manner just described for another course of knitting.

It will be evident from inspection of the drawings that when a jack is not moved from the position shown in Fig. 8 to an interlocking position such as that shown in Fig. 9 and by means of a plunger 15, the jack remains in its relatively outward position and movements thereafter imparted to the needle and companion jack fail to cause the jack to influence or control the movements of the needle, in other words, the movements of the needles not controlled by the jacks are solely controlled by the usual cams acting upon the needle butts 133.

Figure 5:
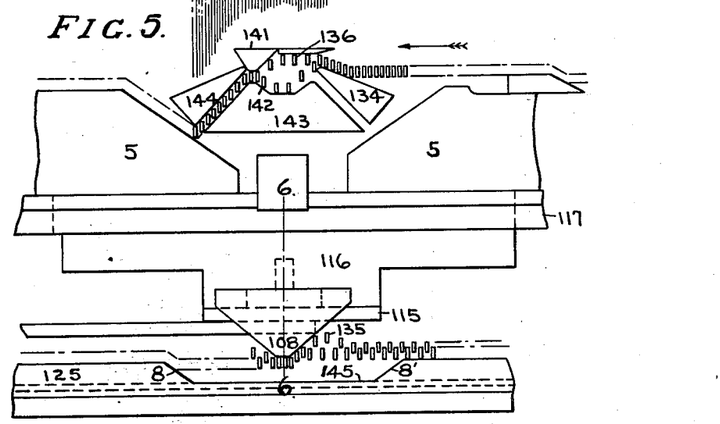
Fig. 5 is a fragmentary view showing the paths of the butts of the selected and non-selected needles as well as of the butts of the jacks for controlling the said needles.
Figure 7:
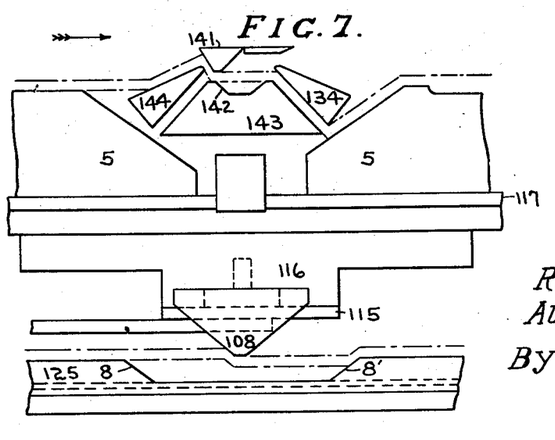
Fig. 7 is a view similar to Fig. 5, but showing the paths of the needle and jack butts during reverse strokes of reciprocatory knitting.

As shown in Figs. 5 and 7 a recess 145 is provided in a jack cam ring 125, such recess permitting the jack butts 135 to be depressed to the desired extent by means of the cam 108, the said butts 135 of the jacks thereafter riding up an inclined or cam surface 8 provided by the cam ring 125.

Figure 18:
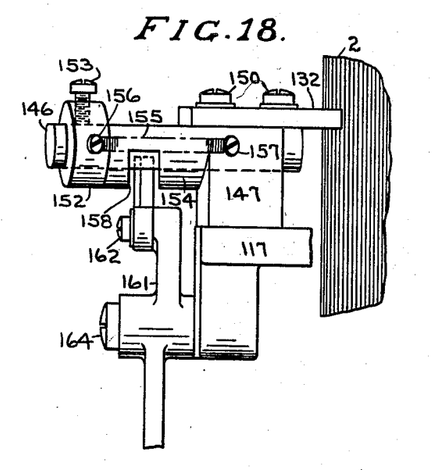
Fig. 18 is a view in side elevation showing one of the cam mechanisms disclosed in Figs. 16 and 17, the cam being shown in a position adjacent to the needle cylinder and corresponding to the position shown in Figs. 15 and 16.
Figure 19:
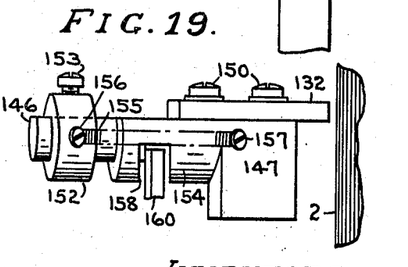
Fig. 19 is a view corresponding to Fig. 18 but showing the cam in a retracted position and corresponding to the position indicated in Fig. 17.

The cam 132 to which reference has just been made, is, as shown in Figs. 13, 15, 16, 17, 18 and 19, adjustably mounted on a half-round rod 146 which latter is slidably mounted in a bracket 147 which is, in effect, an extension of the instep bracket 148 upon which is mounted the usual instep cam 149. As stated, the cam 132 is adjustably mounted upon the half-round rod or bar 146 such adjustment being effected by causing pins or screws 150 to pass through slots 151 in the cam 132 and then into screw threaded engagement with the half-round bar or rod 146. The pin and slot connection 150, 151 permits the cam 132 to be adjusted circumferentially so as to position the same closely adjacent to but slightly spaced from the cams or plungers 15. It is not desirable that the cam 132 engage the needle butts 133 while a plunger or cam 15 is in engagement with one of the frangible butts 131, but it is essential that the said cam 132 engage the butts 133 as soon as possible after the companion jack butts 131 move past a plunger or cam 15, and it is with that in view that circumferential adjustments of the cam 132 are provided by the pin and slot connection 150, 151. As hereinbefore stated the half-round bar or rod 146 is slidable in a bracket 147 thereby to permit the cam 132 to be moved to and from the positions shown in Figs. 18 and 19. The bar 146 and consequently the cam 132 are moved from the position shown in Fig. 18 to the position shown in Fig. 19 by automatic means presently to be described. When in the inner position, i. e., when the cam 132 is adjacent to the needle cylinder, as shown in Fig. 18, a collar 152 which is retained in adjustable, fixed position on the rod 146 by means of a set screw 153, contacts with the adjacent face of the cross-sectional U-shaped extension 154 of the bracket 147, the collar 152 being retained in such position by means of a coil spring 155 one end of which is connected to a pin or screw 156 connected to and projecting laterally from the collar 152 while the other end of the coil spring 155 is connected to a similar pin or screw 157 carried by bracket 147. The U-shaped bracket extension 154 is provided with a transversely extending notch 158 and the rod 146 is likewise provided with a recess one side of which is defined by an incline or cam face 159, adapted to cooperate with which is a cam 160. The cam 160 consists of a plate adjustably connected to a lever 161 as by means of screws 162. The cam 160 is provided with a beveled or wedge shaped end 163 for cooperating engagement with the opposite beveled or inclined cam face on the rod 146. When the lever 161 which is pivoted at 164 to a depending portion of the cam ring 117, is rocked in a manner hereinafter to be described, the cam 160 is moved from the position shown in Figs. 16 and 18 to the position shown in Figs. 17 and 19 the result being that the adjacent and oppositely beveled faces or cams 163 and 159 are caused to engage, the cam 160 thereby causing the rod 146 to be moved outwardly and against the retractile force of the spring 155 to the position shown in Fig. 19, whereby the cam 132 is moved outwardly from the needle cylinder where it remains during reciprocatory knitting such as during the knitting of heels and toes. If the cam 132 were in a position adjacent to the needle cylinder during the reverse strokes of heel and toe knitting, i. e., from right to left, Fig. 22, the needle butts 133 would strike the vertically disposed leading edge of the cam 132 and become broken. The means for rocking the lever 161 upon its pivot 164 consists of a link 165 which is pivotally connected to the arm of the lever 161 that depends and passes through a suitable slot provided in the circular base 7. The engagement between the link 165 and the depending lever arm is a pivotal one, the lever arm and link being both pivotally mounted upon a pin 166. The link 165 and parts connected thereto (not shown) are operated in the usual manner, i. e., in such a manner that the instep cam 149 may be elevated prior to the knitting of heels and toes and restored to its original position immediately following the completion of the knitting of heels and toes. The construction specifically disclosed in Figs. 13, 15, 16, 17, 18 and 19 so connects the rod 146 to the operating mechanism of the instep cam 149 as to cause the rod 146 and consequently the cam 132, to be retracted when the instep cam 149 is moved to the elevated position it assumes during the knitting of heels and toes; and conversely when the cam 149 is lowered to feeding positions, the connections between the rod 146 and the operating connections to the cam 149, are such that the said cam 132 is permitted—due to the influence of the spring 155—to re-assume its position adjacent to the needle cylinder which position is shown in Fig. 18.

Figure 21:
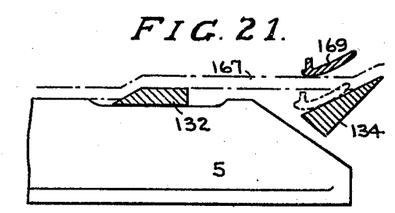
Fig. 21 is a fragmentary view showing a portion of the path of the needle butts during circular knitting.
Figure 22:
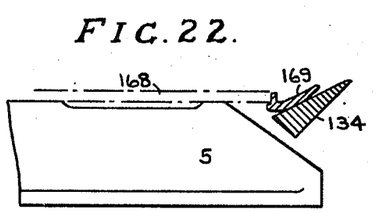
Fig. 22 is a view similar to that shown in Fig. 21 but showing the narrowing pick in operation and during reciprocatory knitting.

In Figs. 21 and 22 the paths of the needle butts during circular knitting and during reciprocatory knitting are shown, the path 167 being the path the needle butts traverse during circular knitting, the path 168 being the one traversed by the butts of the needles during forward strokes of reciprocatory knitting. A usual narrowing pick 169 is shown in said Figs. 21 and 22, the said pick in Fig. 21 being shown as resting on the tops of the needle butts, as it does during circular knitting; and being shown in Fig. 22 as being acted upon by the advancing and leading short butt needle for the purpose of elevating the said needle to the instep level. The pick 169 moves from the full line position, Fig. 21, to the dotted line position thereof during the last circular movement preceding reciprocatory knitting, the long butt needles at such times having been elevated to the instep level by means of the instep cam 149.

Jack retaining bands 170 are provided which merely retain the jacks 9 in the slots of the needle cylinder by preventing the said jacks from falling out of the cylinder slots, the spring bands 170, being in engagement with the needle cylinder walls, do not act to force the jacks 9 inwardly with respect to the needle cylinder so as to cause engagement between the interengaging formations 122 and 123 provided respectively on the jacks and needles. The bands 170 are retained in proper elevated position around the needle cylinder by means of the cam ring 117 which is recessed as at 171 thereby to provide a seating for the spring bands 170. The spring bands are prevented from downward movements by means of plates 172 which are retained in position in contact with the lower face of the cam ring 117 by means of screws 173. The forward edge or face of each plate 172 is closely adjacent to the needle cylinder walls and in such a position as to prevent downward movements of the spring bands 170. It is desirable that the spring bands be retained in a position well above the uppermost butts 131 so that they (bands) will not be in a position to be engaged by a plunger 15 when it is advanced to the position shown in Fig. 9.

Figure 23:
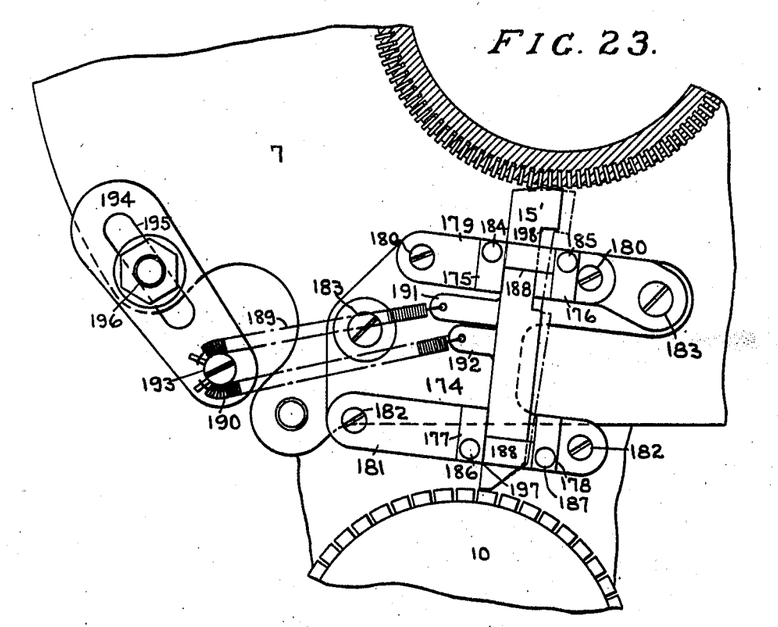
Fig. 23 is a fragmentary view in plan showing a modified form of jack selecting means.

In Fig. 23 there is shown a slightly modified form of mechanism for controlling the movements of the cams or plungers 15' which while they operate substantially in the same manner as do the cams or plungers 15, are slightly modified in construction and operation as compared with the said cams or plungers 15. In the event that a jack 9 is slightly oversize and projects beyond the cylinder slots a greater distance than do other jacks, such jack may become damaged upon approaching and engaging a cam or plunger 15' unless some means be provided for permitting a slight play or movement of such plunger 15'. The means for effecting the desired result is obtained by the construction disclosed in Fig. 23 wherein a plunger 15' is shown as being slidably mounted in a bracket 174 which has upstanding guiding walls 175, 176, 177 and 178. The walls 175, 176 are part of the bracket 179 which is attached to the bracket plate 174 as by means of screws 180, and walls 177, 178 are likewise part of bracket 181, said bracket being attached to the bracket plate 174 as by means of screws 182. The plate 174 is in turn connected to the circular base 7 as by means of screws 183. Passing vertically through the brackets 179 and 181 are pins 184, 185, 186 and 187, the function of the pins being to retain horizontally disposed plates 188 in position. The plates 188 act as horizontal separators for maintaining the plungers or cams 15' in position and further serve as bearings to support the sliding movements of the plungers of cams 15'. Normally the plungers 15' are maintained in the position shown in Fig. 23 by means of coil springs 189, 190 which are attached to lugs 191, 192, carried by and laterally projecting from the plungers 15'. The said springs are also attached to a pin or screw 193 which upstands from a bracket plate 194, the latter being provided with a longitudinal slot 195 through which passes a bolt 196 which also passes through the circular base 7, the purpose being to permit adjustments of the pin 193 with respect to the plungers 15' so that the tension of the springs 189, 190 can be adjusted. Should an over-sized jack 9 approach and engage a plunger 15' such plunger would be moved and might be moved to the extent indicated in dotted lines in Fig. 23. The movement of the plunger 15' to the said dotted line position would rock the said plunger on a fulcrum indicated at 197 and against the tension of a spring 189 or 190. As will be evident from inspection of Fig. 23, the movement of a plunger 15' from the full line to the dotted line position would cause the edge engaged by the jack butts to recede slightly, i. e., move away from the needle cylinder, the result being that the continued movements of the needle cylinder would cause the over-sized jack 9 to pass by the plunger 15' without causing damage to the jack or plunger. Immediately upon passage of the over-sized jack, the plunger 15' would be restored to the full-line position shown in Fig. 23 by means of the spring 189 or 190. The plungers 15' are recessed or notched as indicated at 198 for the purpose of allowing a greater movement of the said plungers in a direction from left to right, Fig. 23, when a plunger is engaged by an over-sized jack in the manner just described. When the plungers 15' are in the full-line position shown in Fig. 23, they are maintained in engagement with the adjacent faces of the upstanding walls 175 and 177.

Reference is made in the specification and in some of the claims to the fact that some of the jacks and needles are selected, and "selected" may either refer to the jacks and companion needles interlocked as shown in Figs. 9 and 10, or to the other jacks and companion needles, i. e., the ones not interlocked.

Although in the foregoing description various parts have been referred to in specific terms, there is no intention thereby to limit the appended claims, it being evident that modifications may be resorted to within the scope of the appended claims.

We claim:

1. In a knitting machine, needles having butts, cams for acting upon said butts and actuating needles and jacks each having a plurality of selecting butts for selectively controlling the said needles, the jacks being movable from a needle engaging position to a position outwardly thereof in which second position the jacks and needles are independently movable, in combination with a cam between which and the jacks there are relative movements so that all the jacks are acted upon by the said means for re-positioning all of the jacks in the position second mentioned.

2. In a knitting machine, needles having butts, cams for acting upon said butts and actuating needles and jacks each having a plurality of selecting butts for selectively controlling the said needles, the jacks having operating butts and being movable from a needle engaging position to a position outwardly thereof in which second position the jacks and needles are independently movable, in combination with a means between which and the jacks there are relative movements so that all the jacks are acted upon by the said means for re-positioning all of the jacks in the position second mentioned, the re-positioning means consisting of a cam adapted to engage the tails of the jacks below their operating butts.

3. A knitting machine having cooperating needles and jacks, the jacks being below and individual to the needles and being selectively controlled for in turn selectively controlling the operations of the needles, means for selecting the jacks and other means for thereafter, in the knitting cycle, retracting the jacks which retract the selected needles so that the needles shall move in a path other than the path of the needles not so selected for the purpose of missing a yarn, in combination with means for feeding one yarn to the needles at one level and another yarn to the needles at another level so that the needles that move in one of the said paths knit the two yarns and the needles that move in the other said path knit one yarn only.

4. A knitting machine having cooperating needles and jacks having butts, the jacks being below and individual to the needles and being selectively controlled for in turn selectively controlling the operations of the needles, cam means for selecting the jacks and other means for thereafter, in the knitting cycle, moving the jacks and selected needles so that the needles shall move in a path other than the path of the needles not so selected, in combination with means for removing the cam means from jack butt engaging position prior to the knitting of heels and toes.

5. A knitting machine having cooperating needles and jacks having butts, the jacks being below and individual to the needles and being selectively controlled for in turn selectively controlling the operations of the needles, cam means for selecting the jacks and other means for thereafter, in the knitting cycle, moving the jacks and selected needles so that the needles shall move in a path other than the path of the needles not so selected, in combination with means for removing the cam means from jack butt engaging position prior to the knitting of heels and toes, said last mentioned means consisting of a main cam drum and levers and connections operatively connected to the said drum and to the said means.

6. In a knitting machine, needles having butts and cooperating jacks, the jacks being constantly actuated and when in one position being engageable and movable with companion needles but when in another position being movable independently of their companion needles, in combination with a cam operable upon the needle butts for elevating them and causing positive inter-engagement between the needles and selected, companion jacks.

7. In a knitting machine, needles having butts and cooperating jacks, the jacks being constantly actuated and when in one position being engageable and movable with companion needles but when in another position being movable independently of their companion needles, in combination with a cam operable upon the needle butts for elevating them and causing positive inter-engagement between the needles and selected, companion jacks, and means for automatically actuating the cam to withdraw the same from needle engagement prior to reciprocatory knitting.

8. A knitting machine having needles having butts and cooperating jacks and having an instep cam for elevating needles prior to reciprocatory knitting and restoring them to knitting position at the completion of reciprocatory knitting, the jacks being constantly actuated and when in one position being engageable and movable with companion needles but when in another position being movable independently of their companion needles, in combination with a cam operable upon the needle butts for elevating them and causing positive inter-engagement between the needles and selected, companion jacks and means for automatically actuating the cam to withdraw the same from needle engagement prior to reciprocatory knitting, the means for automatically actuating the cam being also operatively connected to the instep cam for automatic operation thereof.

9. A jack for use in a knitting machine having an actuating butt to be engaged by cam means for imparting longitudinal movements and a series of frangible butts for selective purposes, the said butt first mentioned being adjacent to one end of the jack and a hook-shaped interlocking formation adjacent to the other end thereof.

10. A knitting machine of the independent needle type having plain needles and jacks each having a plurality of selecting butts independently mounted therein, means for actuating all the jacks during each course of a plurality of courses, and other means for selectively controlling the movements of the jacks so that some of them shall cause their companion needles to function in a manner different from the remaining needles during the knitting of the mentioned courses to effect the knitting of plain (non-rib) fabric having special stitches in selected wales and courses, inter-engaging formations on the companion needles and jacks such interengaging formations causing the needles to move with the jacks to a relatively retracted position.

11. A circular knitting machine of the independent needle type having a needle cylinder and needles and jacks independently mounted in the slots thereof each jack being provided with a plurality of selective means and with a butt, a fixed cam for engaging the butts on the jacks and thereby advancing the jacks, selectively controlled members for operating upon the selective means of the jacks and thereby determining which jacks shall be moved to an operative position with respect to their companion needles, means for acting upon the needles when the jacks have been selected and in such a manner as to cause positive inter-engagement between the needles and their companion, selected jacks.

12. A circular knitting machine of the independent needle type having a needle cylinder and needles and jacks independently mounted in the slots thereof each jack being provided with a plurality of selective means and with a butt, a fixed cam for engaging the butts on the jacks and thereby advancing the jacks, selectively controlled members for operating upon the selective means of the jacks and thereby determining which jacks shall be moved to an operative position with respect to their companion needles, means for acting upon the needles when the jacks have been selected and in such a manner as to cause positive inter-engagement between the needles and their companion, selected jacks, the jacks being thereafter so controlled as to cause retraction of the selected jacks and their companion needles.

13. An assembly consisting of a needle and jack, said needle and jack each having actuating butts and interengaging formations so constructed that movements imparted to either the needle or the jack correspondingly move the other when such movements are applied in one direction, but the construction being such that when movements are applied to either member in the opposite direction, the one element will not move the other and the formations will be disengaged.

14. A jack for use in a knitting machine having an actuating butt adjacent one end thereof, a point about which said jack may pivot, a connecting formation at the other end for engaging with a knitting instrumentality, a plurality of selective butts between the pivot point and the connecting formation and a repositioning extension on the opposite side of said pivot point from said selective butts.

15. A knitting machine having independently movable needles and jacks, the jacks being companion to the needles and each having a plurality of selective conformations, the construction being such that the needles may be retracted without correspondingly moving the jacks, means for selectively engaging the conformations to impart movements to the jacks to effect such inter-engagement between the jacks and companion needles as to cause retraction of the jacks to retract their companion needles.

16. A knitting machine having independently movable needles and jacks, the jacks being companion to the needles and each having a plurality of selective conformations, the construction being such that the needles may be retracted without correspondingly moving the jacks, means for selectively engaging the conformations to impart rocking movements to the jacks to effect such inter-engagement between the jacks and companion needles as to cause retraction of the jacks to retract their companion needles.

17. A knitting machine having independently movable needles and jacks, the jacks being companion to the needles and each jack having selective butts, the construction being such that the needles may be retracted without correspondingly moving the jacks, means for selectively engaging the jack butts as to cause the jacks to move transversely and effect engagement with their companion needles in such a manner that upon the selected jacks being retracted their companion needles will also be retracted.

18. A knitting machine having independently movable needles and jacks, the jacks being companion to the needles and each jack having a plurality of selective butts, means for retracting all the jacks, the construction being such that the needles may be retracted without correspondingly moving the jacks, means for selectively engaging the butts to impart such movements to the jacks as to cause them to engage their companion needles, the needles companion to the moved jacks after such engagement being retracted by the subsequent movements of the jacks, the subsequent movements of the other jacks not affecting the movements of their companion needles.

19. In a knitting machine, needles having actuating butts, jacks individual to each needle and having connecting means for cooperating with a similar connecting means on the needle, a butt on each jack and means for continuously causing said jacks to be moved, a plurality of selecting butts on each jack and means for functioning upon selected ones of said butts to engage a jack with its needle, the construction being such that when a jack is not engaged with its needle the needle will knit one type of stitch but when a jack is engaged with its needle, that needle will knit a different type of stitch.

20. In a knitting machine, cooperating needles and jacks, each needle having a butt thereon and means associated therewith for actuating the needle to draw knitted loops, said jacks each having an actuating butt and means operating thereon to impart continuous reciprocatory movement to the jack and also having connecting means for engaging cooperating connecting means on the end of the needle, a plurality of selecting butts on each jack and means for selectively engaging said butts to move the jack for engaging it with the needle, the construction of each needle and jack being such that the stitch drawing movement imparted to the needle causes a disengaging movement of the jack and allows relative movement between the two elements, whereby for a fixed length of needle cylinder within which the needles and jacks are mounted, more selecting butts can be provided on a jack.

21. A knitting machine having independently movable knitting instrumentalities, the said instrumentalities having conformations selectively arranged on one edge, in combination with cams differently positioned so that they may act selectively upon the conformations on the knitting instrumentalities, there being relative movements of the conformations with respect to the cams so that all of the said instrumentalities may be selectively acted upon by the said cams, means for yieldingly maintaining the cams in position to engage the conformation on the instrumentalities to select the same, the construction being such that an over-dimensioned conformation will cause a said cam to recede slightly to permit the conformation to move past the said cam without breaking.

22. A needle having at one end thereof stitch drawing means and adjacent to the other end thereof having actuating means, the needle projecting beyond the actuating means and in the opposite direction from the stitch drawing means being provided with a formation for readily detachable interlocking engagement with a companion formation on a jack, said formation being constructed so that the companion formation may be disengaged therefrom during operation of the needle and jack in a knitting machine.

23. In a knitting machine having needles and jacks for selectively controlling the same, means for selecting the jacks, spring bands for retaining the jacks in position in the needle cylinder, and means for retaining the spring bands and keeping them out of the path of movement of jack selecting means including a cam support encircling the cylinder and recessed to receive said spring bands, and a plate for confining said bands within said recess.

ROBERT H. LAWSON.
AUGUSTIN GAGNÉ.